2,772,271
Patented Nov. 27, 1956

2,772,271

ADDITION OF OLEFINS AND AMINES

Wilbert H. Urry, Chicago, Ill., assignor to Commercial Solvents Corporation, Terre Haute, Ind., a corporation of Maryland No Drawing. Application December 1, 1953,
Serial No. 395,618

9 Claims. (Cl. 260—293)

My invention relates to a process for effecting alpha carbon alkylation of amines and more particularly it relates to the addition of terminal olefins to amines.

Conventional processes for the production of many amines including alkaloids and alkaloid intermediates are frequently tedious, requiring multiple steps leading to low yields of the desired product. For example, coniine is prepared by condensing picoline with acetaldehyde at high temperatures to obtain alpha-propenyl-pyridine. An intermediate product in this reaction is methyl-picolyl-carbinol. Propenyl-pyridine is then reduced to obtain dl-coniine.

I have now discovered a process for alkylating amines which provides a much simpler, 1-step process for producing many amines heretofore produced only with difficulty. This new process is direct and gives good conversions and yields of the desired products.

My new process for alkylating amines at the α-carbon atom consists essentially of reacting a terminal olefin with an amine selected from the group consisting of primary amines, secondary amines and heterocyclic tertiary amines. The reaction which forms the essential step of the process is conducted in the presence of an alkylation inducing agent and at moderate temperatures to obtain the desired products.

The olefinic material which I employ in my process is a terminal olefinic compound i. e. one which has the = between two end carbon atoms in the chain. The straight chain on the olefinic compound can be unsubstituted or substituted with a hydroxy or cyano radical. Suitable olefinic materials include straight chain olefins such as ethylene, propylene, hexene-1, octene-1, etc.; hydroxy substituted olefins such as allyl alcohol, etc.; cyano substituted olefinic materials such as allyl cyanide, etc.

The amine with which the terminal olefinic compound is reacted to form the amine addition products is one selected from the group consisting of primary amines, secondary amines and heterocyclic tertiary amines, such as N-methylpiperidine. Suitable primary amines which can be used in the process of this invention include n-hexylamine, n-butylamine, isopropylamine, cyclohexylamine, etc. Suitable secondary amines which can be employed include piperidine, pyrrolidine, etc.

As indicated above, the reaction which is the essential step of the invention is carried out in the presence of an alkylation inducing agent and it has been found that light and alkyl peroxides are very suitable agents for promoting the addition reaction. Suitable peroxides include t-butyl peroxide, t-amyl peroxide, 2,2-bis-(5-butylperoxy)-butane, etc.

The reaction can conveniently be carried out when peroxides are employed as the alkylation inducing agent at temperatures ranging from about 90 to about 130°. However any temperature above the decomposition temperature of peroxides can be used. When light is employed as the alkylation inducing agent, much lower temperatures can be employed such as from about 30 to about 50° C. although a longer reaction time is necessary.

When gaseous reactants such as, for example, ethylene, propylene, etc. are employed such gaseous materials can be introduced to the reaction under pressure and maintained in that state throughout the reaction period. A gas pressure of from 30 to 40 pounds per square inch has been satisfactorily employed although higher and lower pressures can be used, the main requirement being sufficient pressure to keep the gaseous reactant in the reaction mixture.

In carrying out the process of this invention, the addition of the amine to the olefin results in the replacement of a hydrogen atom, which is attached to the carbon atom of the amine in the alpha position to the amino group, by an alkyl group furnished by the olefinic compound. The mechanism of this reaction leads to the formation of products of differing complexity in the alkyl group substituted since the products of the reaction can be combinations of olefin and amine in 1 to 1, 2 to 1, 3 to 1, and higher whole number ratios of olefin to amine. The addition product having a 1 to 1 ratio of olefin to amine has merely 1 olefin radical attached to the carbon atom alpha to the amino group of the amine starting material while a product having a 2 to 1 olefin to amine ratio has the 1 olefin radical of the 1 to 1 olefin to amine compound extended by the addition of another olefin radical to the olefin radical which adds to the amino compound. Products with higher olefin to amine ratios merely have extended olefinic chains in the manner described. High yields of products having the lower ratios of olefin to amine are favored by high amine to olefin concentration ratios in the reaction mixture. Concentration ratios of amine to olefin in the reaction mixture above about 10 give particularly high yields of products having therein a 1 to 1 ratio of olefin to amine.

The following examples are offered to illustrate the invention, however, it is not intended that the invention be limited to the specific materials, proportions, conditions, etc., set forth in the examples, but rather it is intended that all equivalents apparent to those skilled in the art be included in the scope of the invention as described in this specification and the attached claims.

Example I

Into a 1-liter round-bottom flask equipped with a condenser to which a dropping funnel was fused were placed 81 grams of piperidine and 1.1 grams of t-butyl peroxide, the mixture being held at 125° C. for 24 hours under a pressure of 30 to 40 pounds per square inch of ethylene. Additional t-butyl peroxide (1.8 grams) was added eight hours after the reaction was begun. Distillation of the reaction mixture gave 2-ethylpiperidine (B. P. 73–75° C. at 52 mm., $n_D^{20}$ 1.4544). 2-ethylpiperidine, hydrochloride M. P. 180–181° C., 2-ethylpiperidine picrate M. P. 130–131° C.

Example II

An 87 gram portion of piperidine was reacted with propylene in the presence of 1.2 grams of t-butyl peroxide at 125° C. in the same manner as in Example I. The reaction was carried out for 12 hours after which t-butyl alcohol and unreacted piperidine were distilled off, leaving a residue from which d,1-coniine was isolated by distillation. The product was identified by its hydrochloride which melts at 211–212° C., the product having a boiling point of 93° C. at 70 mm., $n_D^{23}$ 1.4513.

Example III

A reaction mixture consisting of 370 grams of butylamine, 28 grams of octene-1 and 4.5 grams of t-butyl peroxide was placed in a glass bomb tube situated in an electrically heated cylindrical oil bath. The reaction mixture was heated at 123–126° C. for 48 hours and then distilled to remove t-butyl alcohol, unreacted octene-1 and unreacted butylamine, the residual addition product then being distilled to give 4-aminododecane (B. P. 70–71° C. at 1 mm., $n_D^{20}$ 1.4407).

*Example IV*

A solution of 24 grams of allyl alcohol, and 5.0 grams of t-butyl peroxide in 380 grams of pyrrolidine was heated in a bomb tube at 120–122° C. for 48 hours in the manner described in Example III. Straight distillation of the reaction mixture gave, after a removal of the remaining reactants and t-butyl alcohol, 2-(3-hydroxypropyl)-pyrrolidine (B. P. 80–81° C. at 1 mm., $n_D^{20}$ 1.4870). The structure of 2-(3-hydroxypropyl)pyrrolidine was confirmed by its conversion to pyrrolizidine by the method described in Ann., 535 37 (1938).

*Example V*

A solution of 20.5 grams of octane-1 in 207 grams of piperidine was illuminated for 168 hours with a quartz mercury discharge tube. After distillation to remove t-butyl alcohol, unreacted piperidine and unreacted octene-1, the residual reaction product was distilled and 2-octylpiperidine was obtained. 2-octylpiperidine was obtained at a boiling point of 89° C. at 1 mm., $n_D^{20}$ 1.4569. The identity of this product was confirmed by comparison with 2-octylpiperidine prepared in 95% yields by the hydrogenation over Adams' catalyst in acetic acid solution of 2-octylpyridine.

*Example VI*

A reaction mixture containing 374 grams of piperidine, 21 grams of allyl cyanide and 5 grams of t-butyl peroxide was held at 120–124° C. in a bomb for 72 hours. Direct distillation of the reaction product after removal of unreacted piperidine, etc. gave 2-(3-cyanopropyl)-piperidine (B. P. 59 60° C. at 1 mm., $n_D^{20}$ 1.4748).

*Example VII*

A reaction mixture containing 284 grams of N-methyl-piperidine, 20 grams of octene-1 and 6 grams of t-butyl peroxide was heated in a bomb tube at 122–126° C. for 48 hours. t-butyl alcohol and unreacted N-methyl-piperidine and octene-1 were removed by fractional distillation and the residual product then distilled under vacuum to give 2-octyl-N-methylpiperidine (B. P. 84–85° C. at 1 mm., $n_D^{20}$ 1.4593). Further identification of thus substance was obtained by comparison with 2-octyl-N-methylpiperidine prepared by reacting formic acid and formaldehyde with 2-octylpiperidine, the latter material being obtained from picoline.

Now having described my invention, what I claim is:

1. A process for effecting alpha carbon alkylation of amines which comprises reacting a terminal monoolefine selected from the group consisting of unsubstituted olefins, hydroxy substituted olefins, and cyano substituted olefins and an amine selected from the group consisting of primary and secondary alkyl and cycloalkyl amines, saturated heterocyclic secondary amines containing carbon and nitrogen in the heterocyclic ring and saturated heterocyclic tertiary amines containing carbon and nitrogen in the heterocyclic ring and having an alkyl group attached to the nitrogen atom in the presence of an alkylation inducing agent selected from the group consisting of light and alkyl peroxides.

2. A process for effecting alpha carbon alkylation of amines which comprises reacting a terminal monoolefine selected from the group consisting of unsubstituted olefins, hydroxy substituted olefins, and cyano substituted olefins and an amine selected from the group consisting of primary and secondary alkyl and cycloalkyl amines, saturated heterocyclic secondary amines containing carbon and nitrogen in the heterocyclic ring and saturated heterocyclic tertiary amines containing carbon and nitrogen in the heterocyclic ring and having an alkyl group attached to the nitrogen atom in the presence of an alkyl peroxide.

3. A process for effecting alpha carbon alkylation of amines which comprises reacting a terminal monoolefine selected from the group consisting of unsubstituted olefins, hydroxy substituted olefins, and cyano substituted olefins and an amine selected from the group consisting of primary and secondary alkyl and cycloalkyl amines, saturated heterocyclic secondary amines containing carbon and nitrogen in the heterocyclic ring and saturated heterocyclic tertiary amines containing carbon and nitrogen in the heterocyclic ring and having an alkyl group attached to the nitrogen atom in the presence of light as an alkylation inducing agent.

4. A process for the production of d, 1-coniine which comprises reacting piperidine with propylene in the presence of an alkylation inducing agent selected from the group consisting of light and alkyl peroxides.

5. A process for the production 2-(3-hydroxypropyl)-pyrrolidine which comprises reacting allyl alcohol with pyrrolidine in the presence of t-butyl peroxide.

6. A process for producing 4-aminododecane which comprises reacting butylamine with octene-1 in the presence of an alkylation inducing agent selected from the group consisting of light and alkyl peroxides.

7. A process for the production of 2-(3-hydroxypropyl)-piperidine which comprises reacting piperidine with allyl alcohol in the presence of an alkylation inducing agent selected from the group consisting of light and alkyl peroxides.

8. A process for producing 2-(3-cyanopropyl)-piperidine which comprises reacting piperidine with allyl cyanide in the presence of an alkylation inducing agent selected from the group consisting of light and alkyl peroxides.

9. A process for effecting alpha carbon alkylation of amines which comprises reacting 1 mol of a terminal monoolefine selected from the group consisting of unsubstituted olefins, hydroxy substituted olefins, and cyano substituted olefins with at least 1 mol of an amine selected from the group consisting of primary and secondary alkyl and cycloalkyl amines, saturated heterocyclic secondary amines containing carbon and nitrogen in the heterocyclic ring and saturated heterocyclic tertiary amines containing carbon and nitrogen in the heterocyclic ring and having an alkyl group attached to the nitrogen atom in the presence of an alkylation inducing agent selected from the group consisting of light and alkyl peroxides.

References Cited in the file of this patent

UNITED STATES PATENTS

| | | |
|---|---|---|
| 1,992,615 | Hoffman et al. | Feb. 20, 1935 |
| 2,501,556 | Whitman | Mar. 21, 1950 |
| 2,520,104 | Bahner | Aug. 22, 1950 |
| 2,537,857 | Raley et al. | Jan. 9, 1951 |
| 2,611,768 | Butler et al. | Sept. 23, 1952 |
| 2,615,915 | Ladd | Oct. 28, 1952 |
| 2,647,147 | Engelhardt | July 28, 1953 |

FOREIGN PATENTS

| | | |
|---|---|---|
| 662,431 | France | Mar. 19, 1929 |